April 29, 1958 C. L. HORNBERGER 2,832,574
TUMBLER FOR MIXING PLASTIC COMPOSITION
Filed Feb. 1, 1956 2 Sheets-Sheet 1
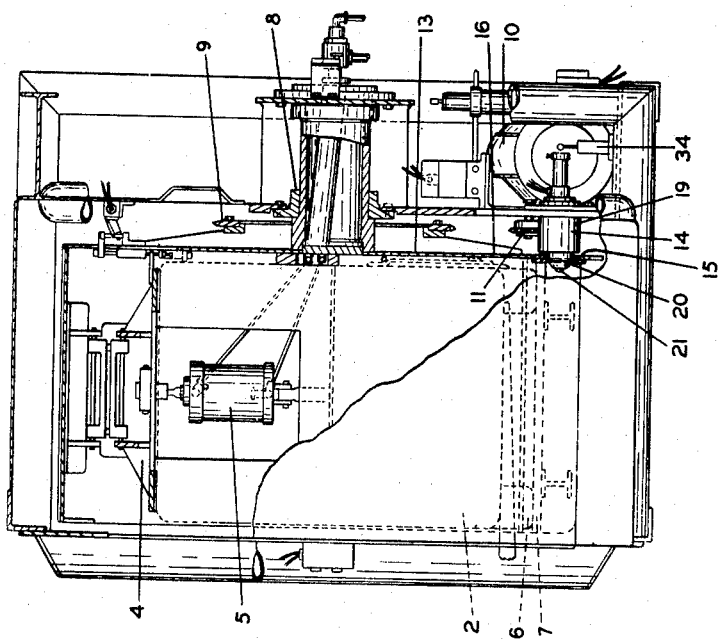
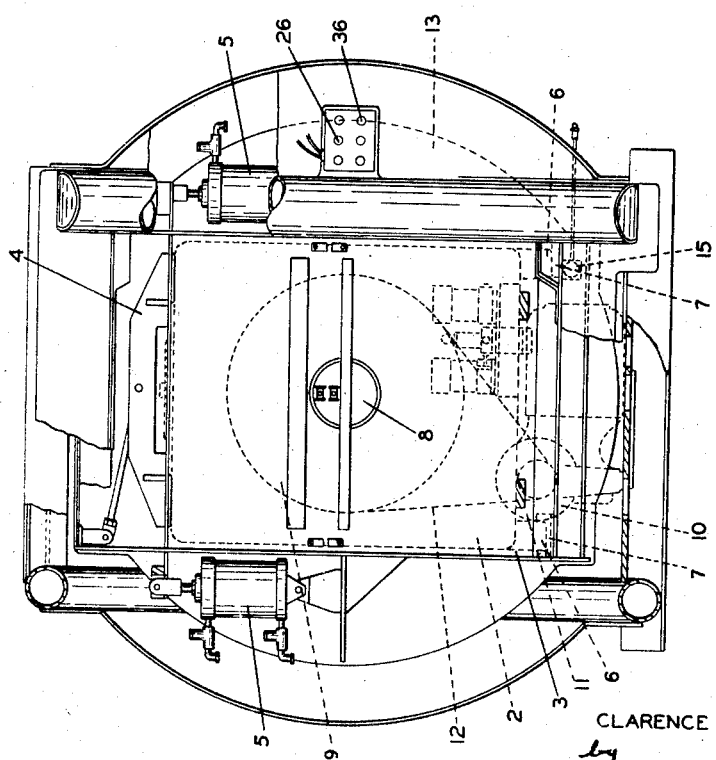
INVENTOR
CLARENCE L. HORNBERGER
by Walter F. Kaufman
ATTORNEY April 29, 1958  C. L. HORNBERGER  2,832,574
TUMBLER FOR MIXING PLASTIC COMPOSITION
Filed Feb. 1, 1956  2 Sheets-Sheet 2

INVENTOR
CLARENCE L. HORNBERGER

ATTORNEY

United States Patent Office 2,832,574
Patented Apr. 29, 1958

2,832,574

TUMBLER FOR MIXING PLASTIC COMPOSITION

Clarence L. Hornberger, Manheim Township, Lancaster County, Pa., assignor to Armstrong Cork Company, Lancaster, Pa., a corporation of Pennsylvania Application February 1, 1956, Serial No. 562,775

4 Claims. (Cl. 259—81)

This invention relates to a tumbling device, and more particularly to a device for accommodating relatively large storage bins and rotating the same about a central axis to pulverize caked materials stored therein.

In the handling of granular material such as plastic composition used in the production of continuous sheets of floor and wall covering, it has been found desirable to mix the raw materials and then store the properly mixed composition in bins until it is needed in production. The material as it is stored in these bins is in chip or flake form. In some instances, it is necessary to store the mixed material for long periods of time and the settling which takes place causes the material to cake. This caking or consolidating is usually so serious that the material cannot be properly fed to processing equipment until it is restored to its original chipped or flaked condition. For ease in handling, it has been found desirable to store the material in movable bins which are of a suitable size to accommodate approximately ¾ of a ton of the prepared composition. By way of example, suitable bins are obtainable on the open market. These bins have an over-all outside dimension of 36″ x 42″ x 52″ and are closed to prevent the egress of dust therefrom.

In order to break up the material stored in these bins, the invention here under consideration was developed to rotate the bin around its central axis and tumble the contents of the bin to break up the cakes.

An object of this invention is to provide a device for tumbling relatively large containers to pulverize the material contained therein.

In order that the invention may be more readily understood, it will be described in connection with the attached drawing, in which:

Figure 1 is front elevational view of the device;

Figure 2 is a cross-sectional view of the device showing the various operating means;

Figure 3:
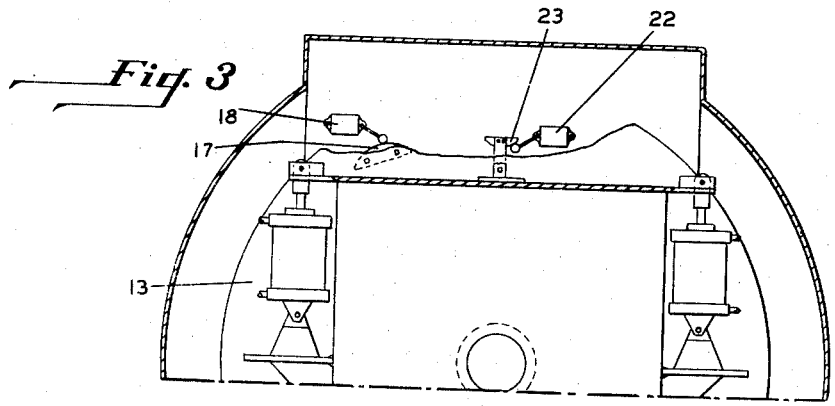
Figure 3 is a diagrammatic view showing the means for operating the controls.

Referring to Figure 1, there is shown in dotted lines one of the bins 2 in position in the device. The tumbling device is provided with a front opening 3 large enough to receive the bin. A clamping device 4 is provided at the top of the tumbler to engage the top of the bin and clamp it firmly in position against the bottom of the bin prior to the start of the rotating cycle. The clamping member 4 is actuated by a pair of pneumatic cylinders 5 positioned one on either side of the machine. The piston of each of these pneumatic cylinders is connected through suitable linkage to the clamping member 4 so that actuation of the piston will bring the clamping member 4 into firm engagement with the top of the bin and release the pressure thereon when desired so that the bin can be removed from the tumbler. The feet 6 of the bin are positioned on suitable rests 7 in the tumbler so that when in proper position the bin will be clamped between the head 4 and the rests 7. This prevents any movement of the bin with respect to the clamping device. The entire tumbler mechanism is mounted on a central bearing 8 which is surrounded by a sprocket wheel 9. This sprocket wheel 9 is driven by a motor 10 which is also provided with a sprocket 11, and a chain 12 between the sprocket 11 and the sprocket 9 imparts rotary motion to the rotatable body 13.

In order to insure against any rotary movement of the tumbler when a bin is not positioned therein, there is provided a locking mechanism 14 as shown in Figure 2. This locking mechanism 14 is operated by a pneumatic cylinder, which is in turn operated by a four-way pneumatic valve. The locking is accomplished by means of a plunger 20 which fits into a hole 15 in the rear plate 16 of the tumbler. The hole 15 is so positioned that when the plunger is located therein the bin is upright and available for removal. The number of revolutions which the tumbler makes is determined by an electric timer which will be described in connection with the electrical system. After the tumbler has made the predetermined number of revolutions, the cam 17 (Figure 3) secured to the rear wall 13 of the tumbler engages a contact switch 18 which actuates the pneumatic cylinder 19, causing the plunger 20 to move forward and enter the hole 15 in the plate 16. The end of the plunger 20 has a roller 21 which rolls on the backing plate 16 until the plunger is in alignment with the hole in the backing plate, at which time the pneumatic cylinder urges the plunger forward into the hole, locking the tumbler in fixed position. With the elements in this relative position, the bin will be in its straight upright position ready for removal by a fork lift truck or other suitable handling equipment. Before the bin can be removed from the tumbler, it is necessary to raise the clamping head 4 away from its engagement with the bin. This clamping head 4 cannot be raised unless the lock 14 is in position, locking the tumbler in its stationary position. The lock cannot be withdrawn from its engagement with the recess in the backing plate 16 so long as the clamping head 4 is raised. After a second bin has been put in position and the clamping head 4 brought down into engagement with the new bin, the clamping head 4 strikes a switch 22 which withdraws the locking mechanism 14, withdrawing the plunger 20 from the hole 15 in the backing plate 16 and permitting the tumbler to rotate again upon energization of the electric circuit by means of manual operation of the start button.

Figure 4:
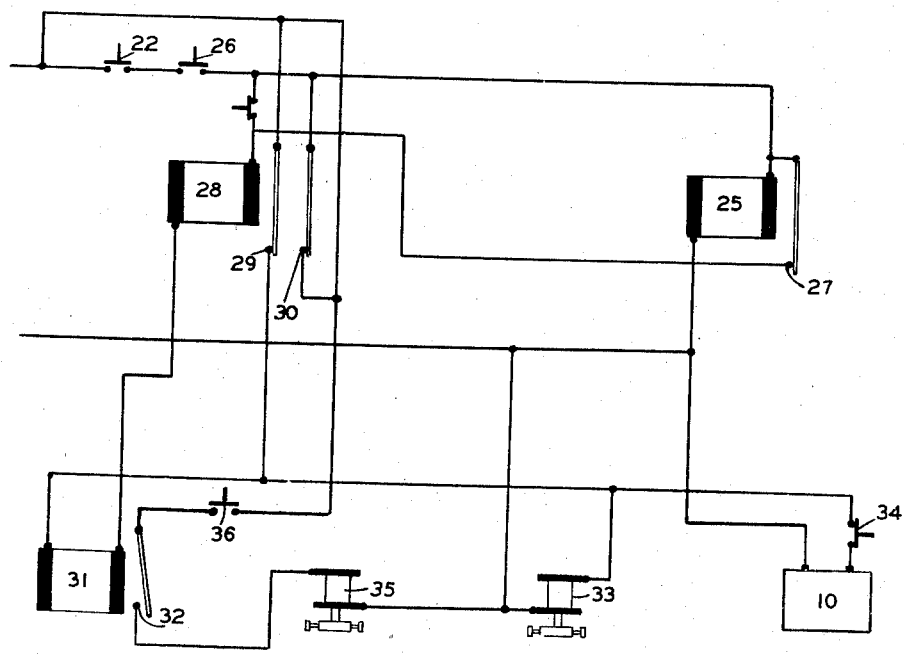
Figure 4 is a diagram of the electrical system for operating the controls.

Referring to Figures 3 and 4, there is shown the control mechanism for operating the device. When the clamping member 4 is lowered into engagement with the bin 2, cam 23 carried by the clamping member 4 engages toggle switch 22, closing the same. This toggle switch 22 is shown in the electrical diagram. When this toggle switch 22 is closed, the circuit to the timer coil 25 (Figure 4) is closed when the manual start button 26 is pressed. Energization of timer coil 25 closes the contact 27, which remains closed while the timer completes its predetermined cycle. With timer coil 25 energized and contact 27 closed, the circuit is closed to relay 28, energizing the same and closing the two contacts 29 and 30. Contact 30 completes the circuit back to the current supply line, which locks the relay 25 in closed position inasmuch as energy can now flow through the contact into relay 25 even though the buttons 22 and 26 are no longer closed.

Contact 29, which is closed by reason of the fact that relay 28 is energized, energizes coil 31, carrying one contact 32 which is open when the coil is energized. Contact 29 also closes the circuit to four-way solenoid valve 33 which controls the air to cylinder 19 in such manner as to withdraw the plunger 20 from the hole 15. As the plunger is withdrawn, it strikes toggle switch 34 which is located in the line between contact 29 to the motor 10. Inasmuch as relay 28 is holding contact 29 in closed position, closing of the switch 34 completes the circuit to the motor and the motor will start to operate the device through the mechanical arrangement described earlier. With this arrangement, the motor is running, operating the device, solenoid valve 33 is holding the locking mechanism out of engagement with the device, and relay 31 is holding contact 32 open so that the line to solenoid valve 35 is de-energized, preventing opening of the clamping mechanism. When the solenoid valve 35 is de-energized, the pneumatic valving is such that the clamping arrangement is held firmly in position in engagement with the top of the bin being rotated.

When timer 25 completes its predetermined cycle, contact 27 opens; however, relay 28 is still energized by reason of its interlock through the normally closed switch 18, which will remain closed until actuated by cam 17 as the bin 2 approaches upright position on the first revolution after the timer 25 has de-energized the coil and broken contact 27. With contact 27 broken and switch 18 open, coil 28 is de-energized, opening contacts 29 and 30. This de-energizes the circuit to the motor 10 and also de-energizes the circuit to solenoid valve 33 and relay 31. With solenoid valve 33 deenergized, the valve reverses, forcing air into the back of the cylinder 19, forcing the plunger forward until the roller-shaped end of the plunger 15 engages the back of the tumbling device. The positioning of cam 17 is such that the circuit to the motor will be broken slightly before the end of the plunger 15 is in alignment with the hole in the plate. Since relay 31 is de-energized, contact 32 is closed, energizing solenoid valve 35, reversing the same so that upon the closing of the button 36 the valve will be energized to permit air to enter the pneumatic cylinders 5 to raise the clamping mechanism.

With this system the bins may be tumbled for a predetermined period of time at the expiration of which the device automatically stops and locks itself so that the clamping mechanism may be released and the bin removed. The control mechanism is such that the device cannot be started until the clamping mechanism is in its lower position which closes switch 22. Likewise, at the completion of the cycle the clamping mechanism cannot be released until relay 1 is de-energized, making it possible to manually close the circuit to solenoid valve 35 to open the clamping mechanism.

In the operation of the device here under consideration, the bin to be tumbled is placed in position in the receptacle-receiving opening in the front of the tumbler. Button 36 is pressed to energize the solenoid valve 35 to admit air into the pneumatic cylinders 5 to bring the clamping head 4 down into position in engagement with the top of the bin, clamping the bin between the head 4 and the rests 7 in the bottom of the tumbler. In this position, the clamping head 4 closes switch 22 through cam 23 which in turn closes the electrical circuit to the solenoid valve 33 to withdraw the plunger 15 from the recess in the backing plate 13. In this position, the tumbler is ready to operate. The withdrawal of the plunger 15 actuates switch 34, energizing the motor 10, which rotates the tumbler through the sprocket and chain arrangement. The rotation continues for a predetermined cycle until the electric timer runs out. After the timer runs out, the next time the cam 17 strikes cam 18, the circuit to the motor is broken and the solenoid valve 33 is de-energized, actuating the four-way valve to admit air to the pneumatic cylinder 14, forcing piston 15 forward into engagement with the hole in the plate 13 to lock the same with the bin 2 in upright position. The clamping head 4 is then pneumatically withdrawn and the bin is taken from the tumbler and placed on the processing line.

It will be clear from this disclosure that I have developed a device for tumbling relatively large heavy bins of loose material in such manner as to eliminate any cakes which have formed during storage and rendering the granular material ready for immediate processing on the conventional sheet-forming equipment.

I claim:

1. In a device of the type described, the elements comprising a rotatable receptacle-receiving device, a receptacle in said receiving device, means for clamping the receptacle firmly in position in said receptacle-receiving device, means for imparting rotary motion to said receptacle-receiving device only after a receptacle has been firmly clamped therein, means for locking said receptacle-receiving device with the receptacle held therein in upright position after the rotating mechanism has ceased functioning, and means for releasing said clamping device only after said locking mechanism has been actuated.

2. In a device of the type described, the elements comprising a rotatable receptacle-receiving device, a receptacle in said receiving device, means for locking said rotatable receptacle-receiving device in upright position for placing a receptacle therein and removing a receptacle therefrom, means for clamping a receptacle firmly in said receptacle-receiving device, means for imparting rotary motion to said receptacle-receiving device only after said locking mechanism has been withdrawn and said receptacle clamping mechanism has been brought firmly into position, means for stopping said receptacle-receiving device with the receptacle in upright position, and means for releasing the clamping mechanism only after the receptacle-receiving device has ceased rotating.

3. In a device of the type described, the elements comprising a rotatable receptacle-receiving device, a receptacle in said receiving device, means for clamping the receptacle firmly in position in said receptacle-receiving device, means for rotating said receptacle-receiving device through a predetermined cycle after the receptacle has been firmly clamped therein, and means for releasing said clamping device only after said predetermined cycle has been completed.

4. In a device of the type described, the elements comprising a rotatable receptacle-receiving device, a receptacle in said receiving device, means for clamping the receptacle firmly in position in said receptacle-receiving device, means for rotating said receptacle-receiving device, means for determining the cycle of rotation of the receptacle-receiving device, means for bringing the receptacle carried by the device into upright position after the termination of said cycle, and means for releasing said clamping mechanism after the receptacle has been brought into upright position.

References Cited in the file of this patent

UNITED STATES PATENTS

| | | |
|---|---|---|
| 153,791 | Stearns et al. | Aug. 4, 1874 |
| 2,291,463 | Gerlach | July 28, 1942 |

U. S. DEPARTMENT OF COMMERCE
PATENT OFFICE

CERTIFICATE OF CORRECTION

Patent No. 2,832,574     Clarence L. Hornberger     April 29, 1958

It is hereby certified that error appears in the printed specification of the above numbered patent requiring correction and that the said Letters Patent should read as corrected below.

Column 3, line 24, for "deenergized" read -- de-energized --; line 4 for "relay 1" read -- relay 31 --.

Signed and sealed this 10th day of June 1958.

(SEAL)
Attest:

KARL H. AXLINE
Attesting Officer

ROBERT C. WATSON
Commissioner of Patents